United States Patent
Newton

(10) Patent No.: US 12,323,481 B2
(45) Date of Patent: *Jun. 3, 2025

(54) NETWORK ADDRESS RESOLUTION

(71) Applicant: Sandpiper CDN, LLC, Wilmington, DE (US)

(72) Inventor: Christopher Newton, Westlake Village, CA (US)

(73) Assignee: Sandpiper CDN, LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/598,631

(22) Filed: Mar. 7, 2024

(65) Prior Publication Data

US 2024/0214347 A1 Jun. 27, 2024

Related U.S. Application Data

(63) Continuation of application No. 18/132,055, filed on Apr. 7, 2023, now Pat. No. 11,929,978, which is a (Continued)

(51) Int. Cl.
*H04L 67/02* (2022.01)
*H04L 47/70* (2022.01)
(Continued)

(52) U.S. Cl.
CPC .............. *H04L 67/02* (2013.01); *H04L 47/70* (2013.01); *H04L 61/30* (2013.01);
(Continued)

(58) Field of Classification Search
None
See application file for complete search history.

(56) References Cited

U.S. PATENT DOCUMENTS 6,185,598 B1 2/2001 Farber et al.
6,654,807 B2 11/2003 Farber et al.
(Continued)

FOREIGN PATENT DOCUMENTS

DE 102011009358 7/2012
EP 2624524 8/2013
(Continued)

OTHER PUBLICATIONS

Chinese Examination Report, dated Sep. 28, 2020, Application No. 201580076890.7, filed Dec. 31, 2015; 3 pgs.
(Continued)

*Primary Examiner* — Lashonda Jacobs-Burton
(74) *Attorney, Agent, or Firm* — C. Tumey Law Group PLLC

(57) ABSTRACT

A content delivery method including the operations of receiving a uniform resource locator resolution request at an authoritative name server for a domain where the uniform resource resolution request is received based, at least in part, on a host name of the uniform resource resolution request where the host name is uniquely related to a resource associated with the uniform resource resolution request. The method further including the operation of tracking a popularity of the resource based on the host name uniquely related to the resource and providing a location within a network capable of delivering the resource where the provided location is based on the popularity of the resource.

10 Claims, 3 Drawing Sheets

Related U.S. Application Data continuation of application No. 17/687,361, filed on Mar. 4, 2022, now Pat. No. 11,627,108, which is a continuation of application No. 16/923,788, filed on Jul. 8, 2020, now Pat. No. 11,277,374, which is a continuation of application No. 16/538,355, filed on Aug. 12, 2019, now Pat. No. 10,715,481, which is a continuation of application No. 14/986,035, filed on Dec. 31, 2015, now Pat. No. 10,382,385.

(60) Provisional application No. 62/126,277, filed on Feb. 27, 2015.

(51) Int. Cl.
*H04L 61/30* (2022.01)
*H04L 61/4511* (2022.01)
*H04L 67/60* (2022.01)
*H04L 61/301* (2022.01)
*H04L 67/1021* (2022.01)
*H04L 101/30* (2022.01)
*H04L 101/604* (2022.01)

(52) U.S. Cl.
CPC .......... *H04L 61/4511* (2022.05); *H04L 67/60* (2022.05); *H04L 61/301* (2013.01); *H04L 67/1021* (2013.01); *H04L 2101/30* (2022.05); *H04L 2101/604* (2022.05)

(56) References Cited

U.S. PATENT DOCUMENTS

| | | | |
|---|---|---|---|
| 7,054,935 B2 | 5/2006 | Farber et al. | |
| 7,945,693 B2 | 5/2011 | Farber et al. | |
| 7,949,779 B2 | 5/2011 | Farber et al. | |
| 8,060,613 B2 | 11/2011 | Farber et al. | |
| 8,281,035 B2 | 10/2012 | Farber et al. | |
| 8,291,046 B2 | 10/2012 | Farber et al. | |
| 8,296,396 B2 | 10/2012 | Farber et al. | |
| 8,412,823 B1* | 4/2013 | Richardson | H04L 47/70 709/225 |
| 8,463,877 B1* | 6/2013 | Richardson | H04L 61/4511 709/219 |
| 8,468,245 B2 | 6/2013 | Farber et al. | |
| 8,473,613 B2 | 6/2013 | Farber et al. | |
| 8,478,903 B2 | 7/2013 | Farber et al. | |
| 8,572,208 B2 | 10/2013 | Farber et al. | |
| 8,572,210 B2 | 10/2013 | Farber et al. | |
| 8,683,076 B2 | 3/2014 | Farber et al. | |
| 8,756,341 B1* | 6/2014 | Richardson | H04L 67/63 709/219 |
| 9,154,551 B1* | 10/2015 | Watson | H04L 67/1014 |
| 9,191,458 B2* | 11/2015 | Richardson | G06F 16/951 |
| 9,787,599 B2* | 10/2017 | Richardson | H04L 67/1023 |
| 9,794,216 B2* | 10/2017 | Richardson | H04L 47/70 |
| 9,800,539 B2* | 10/2017 | Richardson | H04L 67/00 |
| 10,530,832 B2* | 1/2020 | Dziezanowski | G06F 16/9554 |
| 2003/0204529 A1* | 10/2003 | Hertling | G06F 16/9574 |
| 2006/0129665 A1 | 6/2006 | Toebes et al. | |
| 2007/0006155 A1* | 1/2007 | Maennel | G06F 11/3698 717/124 |
| 2008/0086574 A1* | 4/2008 | Raciborski | H04L 61/4541 709/245 |
| 2009/0254661 A1* | 10/2009 | Fullagar | H04N 21/25891 709/226 |
| 2011/0153867 A1* | 6/2011 | can de Ven | H04L 61/58 709/245 |
| 2012/0066360 A1* | 3/2012 | Ghosh | H04L 43/106 709/223 |
| 2012/0167227 A1 | 6/2012 | Henderson et al. | |
| 2012/0198043 A1* | 8/2012 | Hesketh | H04L 61/35 709/223 |
| 2014/0006538 A1* | 1/2014 | Oikonomou | H04L 67/5681 709/213 |
| 2014/0053237 A1* | 2/2014 | Hopen | H04L 45/14 726/1 |
| 2014/0059208 A1* | 2/2014 | Yan | H04L 43/16 709/224 |
| 2014/0068005 A1* | 3/2014 | Rosenfield | G06F 16/9574 709/219 |
| 2014/0289319 A1* | 9/2014 | Richardson | G06F 16/955 709/203 |
| 2014/0344425 A1* | 11/2014 | Varney | H04L 41/0813 709/221 |
| 2015/0012593 A1* | 1/2015 | Phillips | H04L 47/30 709/204 |
| 2016/0191455 A1* | 6/2016 | Newton | G06F 16/955 709/245 |
| 2016/0255042 A1 | 9/2016 | Newton | |
| 2017/0195447 A1* | 7/2017 | Panagos | H04L 67/5682 |
| 2019/0364010 A1 | 11/2019 | Newton | |
| 2020/0344200 A1 | 10/2020 | Newton | |
| 2022/0191166 A1 | 6/2022 | Newton | |
| 2023/0246996 A1 | 8/2023 | Newton | |

FOREIGN PATENT DOCUMENTS

| | | |
|---|---|---|
| JP | 2002520735 | 7/2002 |
| JP | 2011039725 | 2/2011 |
| WO | WO-2012097030 | 7/2012 |

OTHER PUBLICATIONS

Chinese First Office Action, dated Jan. 6, 2020, Application No. 201580076890.7, filed Dec. 31, 2015; 16 pgs.

European Examination Report, dated Feb. 1, 2019, Application No. 15883640.3, filed Dec. 31, 2015; 6 pgs.

Extended European Search Report, dated Jul. 12, 2018, Application No. 15883640.3, filed Dec. 31, 2015; 6 pgs.

International Preliminary Report on Patentability dated Aug. 29, 2017, Int'l Appl. No. PCT/US15/068292, Int'l Filing Date Dec. 31, 2015; 7 pgs.

International Search Report dated Mar. 11, 2016, Int'l Appl. No. PCT/US15/068292, Int'l Filing Date Dec. 31, 2015; 3 pgs.

Invitation to Respond to Written Opinion, Application No. 11201706629R, filed Dec. 31, 2015, 6 pgs.

Japan Notice of Reasons for Refusal, dated Oct. 21, 2019, Application No. 2017-542413, filed Dec. 31, 2015; 6 pgs.

Singapore Search Report and Written Opinion, dated May 17, 2018, Application No. 11201706629R, filed Dec. 31, 2015; 8 pgs.

Written Opinion of the International Searching Authority dated Mar. 11, 2016, Int'l Appl. No. PCT/US15/068292, Int'l Filing Date Dec. 31, 2015; 5 pgs.

* cited by examiner

NETWORK ADDRESS RESOLUTION

TECHNICAL FIELD

Aspects of the present disclosure relate to network address resolution, and particularly involve the assignment of an enhanced host name to resources intended for distribution by a content delivery network, and the use of those enhanced host names to track popularity of the content through DNS and to resolve the request to a CDN node based on popularity of the content.

BACKGROUND

The Internet and the World Wide Web (the "Web") have become ubiquitous. Content providers (publishers) now use the Internet (and, particularly, the Web) to provide all sorts of content to numerous clients all over the world. In order to offload the job of serving some or all of their content, many content providers now subscribe to content delivery networks (CDNs). Using a CDN, content can be served to clients from the CDN (e.g., from one or more servers in the CDN) instead of from the content provider's server(s). In a caching CDN, content may also be cached on some or all of the CDN servers, either before being served or in response to specific requests for that content. Having content cached within edge servers of the CDN enhances the performance of the CDN because the content does not have to be retrieved from mid-tier origin servers or other locations, which are less efficient than edge servers in providing content.

Numerous forms of content may be served from the CDN. For example, television shows and movies may now be accessed from any number of Web sites, and the shows and movies may actually be served from the CDN. Print newspapers have migrated to the Web and provide portals through which clients operating some form of computing device (e.g., PC, smart phone, or tablet), with a browser, app, or the like may access numerous forms of content, such as short video clips, articles, images, and audio tracks. Software updates and patches, once only provided on disc and mailed to recipients, are now routinely distributed to devices using only network connections, and the updates and patches are delivered from a CDN.

It is with these observations in mind, among others, that various aspects of the present disclosure were conceived and developed.

SUMMARY

Embodiments of the present disclosure involve a content delivery method comprising the operations of receiving a uniform resource locator resolution request at an authoritative name server for a domain, the uniform resource locator resolution request received based, at least in part, on a host name of the uniform resource locator resolution request, the host name related to a resource associated with the uniform resource resolution request. The method may further include tracking a popularity of the resource based on the host name related to the resource and providing a node within a network capable of delivering the resource, the provided node based on the popularity of the resource. These operations may be performed by a computing device (or devices) including a processing unit, and may be encoded as computer readable instructions stored on a non-transistory computer readable medium.

Embodiments of the present disclosure may further involve an apparatus comprising at least one processing device in communication with a non-transitory computer readable media including computer executable instructions for receiving a uniform resource locator resolution request at an authoritative name server for a domain, the uniform resource locator resolution request received based, at least in part, on a host name of the uniform resource locator resolution request, the host name related to a resource associated with the uniform resource locator resolution request. The instructions may further be for tracking a popularity of the resource based on the host name uniquely related to the resource.

These and other embodiments are discussed in more detail below.

BRIEF DESCRIPTION OF THE DRAWINGS

The foregoing and other objects, features, and advantages of the present disclosure set forth herein should be apparent from the following description of particular embodiments of those inventive concepts, as illustrated in the accompanying drawings. Also, in the drawings the like reference characters refer to the same parts throughout the different views. The drawings depict only typical embodiments of the present disclosure and, therefore, are not to be considered limiting in scope.

DETAILED DESCRIPTION

Figure 1:
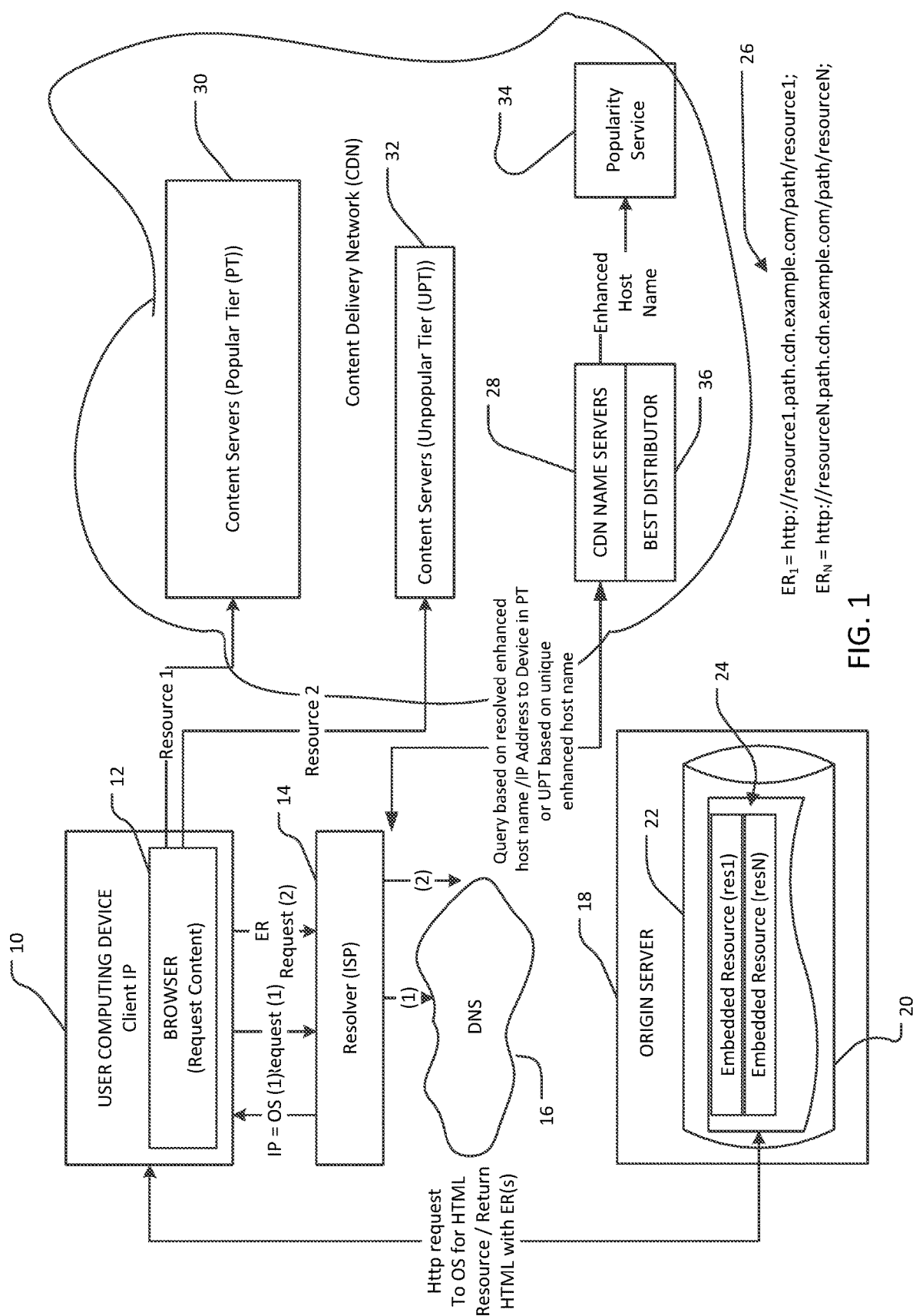
FIG. 1 is a network diagram depicting a content delivery network, and other networks, that tracks resource popularity based on a unique host name assigned to a resource, and can resolve requests to a node within the content delivery network based, at least in part, on the popularity of the resource.

Aspects of the present disclosure involve systems and methods for selecting an edge server, rack, cluster or other device, which may be in a content delivery network (CDN) to serve content to a client. Aspects of the present disclosure also involve tracking the popularity of content (resources) based on the use of a unique enhanced host name assigned to the content. In one example, the popularity designation may take the form of globally assigning an enhanced host name to a resource, which may be done at or in association with the origin server for the resource (or a resource containing embedded resources with unique enhanced host names), where the enhanced host name is specific to the resource. Namely and in one example, at the origin server a unique host name for a resource may be assigned or otherwise defined. As discussed herein, the origin server, which may be a collection of servers and may be distributed, is the source for content from any given content provider. Origin servers may be maintained within the CDN or without.

In many conventional systems, there is not an awareness of the actual resource being request at DNS time (when the host name is being resolved to an IP address); rather, only the host name is known. By providing a unique host name for the resource, some device within the DNS resolution function can track the popularity of the resource by understanding how many times the unique host name is being resolved. Accordingly, a popularity service is coupled with DNS infrastructure that tracks popularity and considers popularity when resolving a DNS request.

Examples of enhanced host names for two resources (resource 1 and resource 2) are as follows:

www.resource1.path.cdn.example.com/path/resource1
www.resource2.path.cdn.example.com/path/resource2

In such a situation, the authoritative name servers for example.com are provided with DNS records to delegate the subdomain (in this example, cdn.example.com) to the name servers of the CDN. Thus, when the requesting clients' ISP resolver contacts the authoritative name servers for example.com in order to resolve such an enhanced unique host name, the resolver is directed to the names servers of the CDN instead. The CDN name servers may track popularity of the resources by counting the number of resolution requests for any particular enhanced host name, and use that when determining to which tier of CDN nodes to direct the client. Within the CDN, one or more content server tiers may be arranged to serve both popular and unpopular content. For example, a relatively large number of content servers, positioned geographically proximate to various possible client locations, may be designated for popular content. Popular content requests from a client will be resolved by the CDN to a server within the popular tier, from where it will be served. As the content has been requested some number of times and tracked through DNS and the enhanced host name, the content will initially be accessed from a machine within the popular tier, and then, depending on the architecture of the CDN, may then be cached at that machine.

The term "content" as used herein means any kind of data, in any form, regardless of its representation and regardless of what it represents. The term "content" may include, without limitation, static and/or dynamic images, text, audio content, including streamed audio, video content, including streamed video, web pages, computer programs, documents, files, and the like. Some content may be embedded in other content, e.g., using markup languages such as HTML and XML. Content includes content which is created or formed or composed specifically in response to a particular request. The term "resource" is sometimes used herein to refer to content.

A resource may also refer to a collection of objects that are combined in some manner to create a resource. For instance, a video or audio stream may be delivered as a series of small chunks (for example of some short duration) of a particular encoding rate. All such chunks, from all such encoding rates, may be considered collectively to a single resource such that they share a common enhanced host name. Similarly, pages that uniquely contain embedded resources may utilise the same enhanced host name for the container (e.g., HTML or XML document) and those embedded resources.

Figure 2:
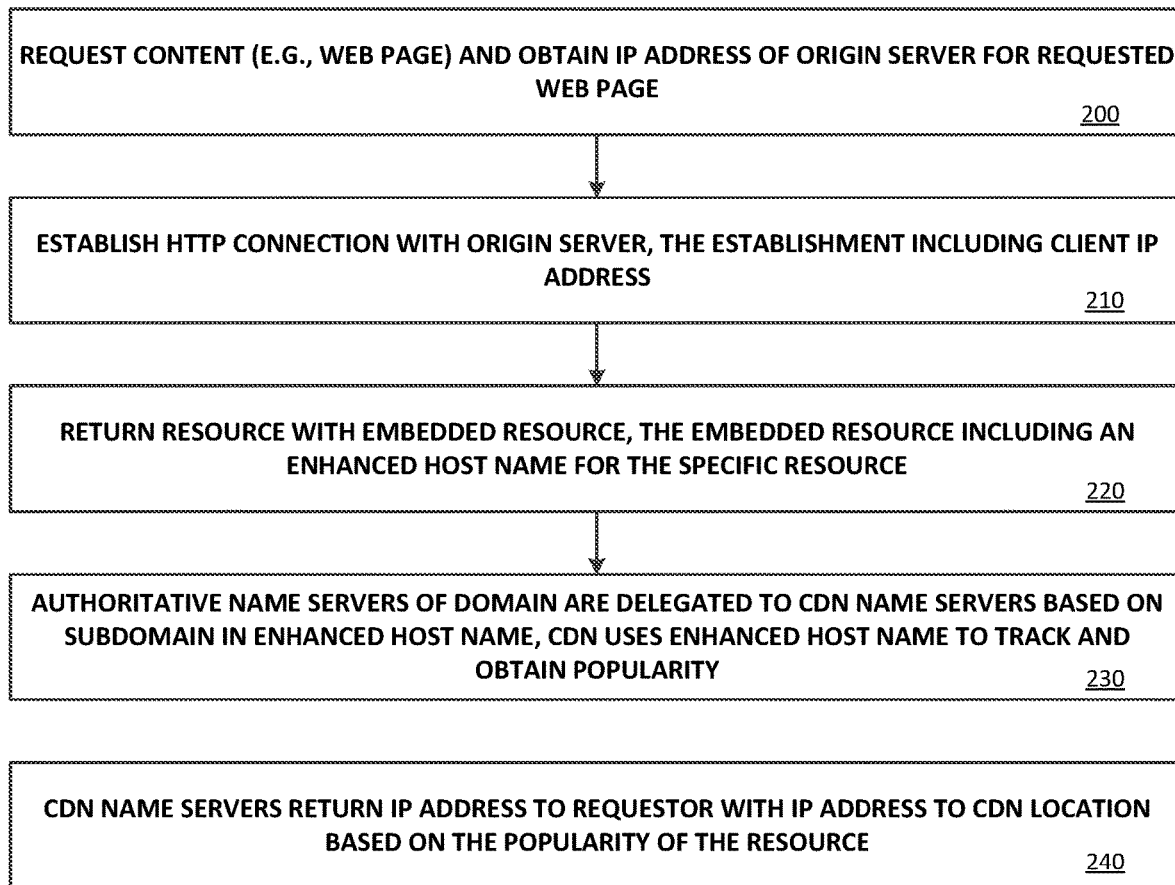
FIG. 2 is a flow diagram illustrating a method of popularity tracking and content delivery based on a unique host name assigned to a resource.

FIG. 1 illustrates one example network configuration for practicing aspects of the present disclosure, while FIG. 2 describes a related method. The illustrated network would include many other components involved in servicing a request and providing content; however, the diagram here focuses on only some components involved in the system and one of ordinary skill will readily understand other conventional components within the network. With respect to content delivery, in this example a request originates from a computing device 10 operating a browser 12. The computing device may be some form of conventional device such as personal computer, a thin client, a tablet, a smart phone, a set-top box, a cable box, or the like, that is capable of running a browser and providing a user with the ability to request content over a network connection, or some other app or application suitable for interacting with a network and requesting content therefrom. The user device may be a consumer device deployed in a public network, may be an enterprise device deployed in a private network or other type of device. The network connection, in many instances, will be provided by an Internet service provider (ISP) operating one or more resolvers 14. A resolver (also referred to as a DNS resolver) is a client-side device used to resolve a network address (e.g., translate a domain name into an IP address) for a requested resource. Generally speaking, the resolver contacts (e.g., queries) a DNS infrastructure 16, which may involve many different components, to resolve a network address for a resource.

To illustrate aspects of the disclosure, consider when a user enters into the browser, the web page address http://www.example.com. The browser 12 contacts or otherwise interacts with the resolver 14, which in turn requests the IP address for the www.example.com Web page from DNS 16 (operation 200). DNS returns the IP address of an origin server 18 capable of delivering a hypertext markup language (HTML) document 20 that will render the Web page in the browser. The present flow discusses contacting an origin server for the Web page; however, this is done for explanation purposes, and it is possible that DNS may resolve the request to some other device for obtaining the Web page. In order to obtain the HTML document, the client device establishes a TCP connection, which may encapsulate an HTTP protocol communication, with the origin server (operation 210). An origin server is a device (or collection of devices) maintaining original copies of content for distribution to client's and/or distribution of copies to other nodes. While the present disclosure is illustrated in association with a connection to an origin server, the connection may instead be made with some other device designated in DNS to serve the requested resource. In this example, the origin server is connected with a database 22, which organizes and manages stored resources in some form of storage device (or devices), such as a storage appliance, that includes the HTML document 20 with an embedded resource 24. The HTML document is what the browser uses to display the Web page www.example.com. In this example, the embedded resource is a link (e.g., a URL) to some form of content that the user can obtain by selecting the link when the Web page is displayed. In the case of an online news site, for example, the home page or any number of sub-pages (HTML documents) may include any number of links to content (embedded resources) such as articles, short video clips, etc. In the case of a television or movie portal, the home page or any number of sub-pages, may include any number of links to particular episodes of a television series or specific movie releases.

The HTML document is provided with URL's 26 of the embedded resources 24 that have unique enhanced host names for the specific resource. Here, the customer of the CDN does not need to understand popularity of the content or otherwise pre-designate popularity. For example, consider the case where www.example.com is the home page for an on-line video provider and the embedded resource is a link to a recently released movie that did well in theaters. In such an example, when the movie is released by the video provider, it will likely be popular (requested numerous times), and thus the enhanced host name for the movie will be resolved by the CDN name servers 28 numerous times and thereby become designated as "popular" by the CDN. In the examples discussed herein, content is either popular or non-popular, and popularity may be designated based on the number of times a specific enhanced host name is resolved by DNS which may specifically be CDN name servers 28 for enhanced host names. However, popularity may be designated in other scales, such as 1=low, 2=medium, 3=high, scale of 1-10 with 1 being unpopular and 10 being the most popular, etc., with thresholds (number of times resolved) pertaining to the scale. Moreover, the scale may be adjusted from an initial designation based on the number of requests for the content, which may be based on discrete times (e.g., number of requests per day, per minute, per second, etc.). Finally, popularity may also be regionalized. For example, a resource in the case of a news story may initially be considered to be popular in the region from which it originates but un-popular in other regions. Say, for example, in the case of a breaking news story in Atlanta, the on-line news story (embedded resource) may be designated popular for Georgia or the Southeast of the United States, but may be designated unpopular for all other geographic regions. Thus, popularity services may be regionalized and popularity tracked based on the number of DNS resolutions in any given geographical region.

To provide a popularity designation at DNS time, a unique enhanced host name is provided for the embedded resource. With respect to the unique enhanced host names, in one example, if resource 1 (e.g., a recently released block buster movie) is given a unique host name and resource 2 (e.g., a very old esoteric documentary film) is given a different unique host name. As introduced above, two enhanced host names 26 may be: Embedded resource 1 (ER1)=(http://resource1.path.cdn.example.com/path/resource1) for the popular content) and Embedded resource 2 (ER2)=http://resource2.path.cdn.example.com/path/resource2 (for the unpopular content). The unique URL host names are embedded within an HTML page 22 from which a user may request either of the resources. Two examples enhanced host names are provided herein; however, any number of alternatives host names may be used, and numbers (N) of resources and corresponding enhanced host names, beyond one or two, may also be used.

Alternatively, the host name need not include an explicit reference to the resource in the path; rather it may include some per-resource identifier, such as an index, a checksum (e.g., MD5) of the path, etc., as discussed in more detail below. The host name could also include the client IP address (or a representation thereof) to count popularity. Alternatively, the relative popularity may be noted at name resolution time, since the same name is likely to be cached for some at the resolver and so may be used by a number of clients without contacting the CDN DNS system.

Returning to the client request, the HTML document 22 is returned to the client device 10 with the embedded resources as described above (operation 220). When the client then selects either resource, the browser 12 again communicates with the ISP resolver 14 to look-up (through DNS) the enhanced host name associated with the resource. Using the popular example, the ISP resolver would contact DNS to resolve resource1.path.cdn.example.com. In one specific implementation, the authoritative name servers for example-.com would delegate the path.example.com subdomain to the authoritative name servers for the CDN 28. When resolving the host name from one of the embedded resources, the ISP resolver associated with the client device would be directed to the authoritative name servers of the CDN, which would then be able to track popularity of each name so requested before determining which popularity tier to assign the request (operation 230). The CDN DNS servers 28 would then select the most appropriate distribution node from within that popularity tier for the client, and return its IP address to the ISP resolver. The CDN name servers may use some form of intelligent traffic management 36 (best distributor algorithms) to direct the client to obtain the content from either a content server in the popular 30 or unpopular 32 domain. Because of the unique enhanced host name, the CDN name servers track the popularity of each unique enhanced host name, which may be achieved by a popularity service 34 associated with the CDN DNS. The CDN name servers also return an IP address for the best server node within the CDN to deliver the content (operation 240). For popular content, the node will be within the popular tier, for unpopular content, the node will be in the unpopular tier.

The intelligent traffic management (ITM) function may return an address that is optimally suited to serve the content to the requesting client. So, in a simple example, for a user in New York requesting popular content from a CDN having nodes capable of serving the content from both California and New York, it may not be optimal to serve the content from California due to any number of reasons including cost, latency, quality, optimal CDN use, and the like. In the present system, the ITM may instead return the New York node to the client in New York. Note, in one example, the CDN name servers may use the location of the resolver 14 as a proxy for the location of the client device 10.

The ITM may take into account and use the IP address of the client device, the IP address of the resolver, customer, and the various other forms of information in determining the node from which to serve the content. For example, the ITM may use geographical information to pick the node closest to the client device or resolver to serve the content. The computing engine may further take into account network traffic, and if the closest node is too busy, then select another node that is close but less busy.

In some instances, such enhanced node selection may only be performed for popular content with unpopular content served from the origin or tiers besides those at the edge. In some instances, for example, the node may not yet have the content stored locally, and upon receiving the request, have to request the content from an origin server, another node, or elsewhere. In such instances, the instruction would cause the node to cache and retain the content and be able to directly serve the next request when operating in a caching CDN, for example.

The CDN name servers return the determined network address (e.g., URL, URI, etc.) to the requesting client device, and the browser 12 (or other device) then may establish a connection with the CDN node designated to serve the embedded resource. The designated node will either have the embedded resource, or it will obtain the content and serve it to the requesting client. Within the CDN, as client's request content, the popular tier nodes will quickly have all of the content cached and be able to deliver the content directly upon receiving a request from a client.

In one possible implementation, the unique hostname may be generated from the path within the base domain. For example, using a function that reverses the order of the path elements and replaces "/" with "." the path /some/dir/resource.ext might result in resourceext.dir.some.path.example.com.

In an alternative implementation, a unique hostname may be used for each resource (which would allow the DNS system to track popularity). So, for a resource such as: http://origin.example.com/path/resource, the system would use a URL such as: http://resource.path.cdn.example.com/path/resource. In this example, the DNS servers see the entire "path," including a representation of the resource and its path. In the example of http://origin.example.com/path/ resource, the DNS servers would not obtain /path/resource, and hence would be unaware of the path and resource subject to the request. However, in the popularity tracking URL, DNS does see a representation of the resource and path, and hence can track the number of times there is a request for the content. Accordingly, DNS may track resource popularity.

In an alternative, the system may use a hostname that uniquely represents each /path/resource at the origin in order to provide popularity tracking without having the actual path and resource name provided in the URL and available to DNS. In such an alternative, the system may use an index or a checksum (e.g., MD5) of the /path/resource to provide a unique host name representative of the path/resource, such as: http://a1242.cdn.example.com/path/resource. In this example, the name within the cdn.example.com domain is different for each different value of /path/resource. Similar to the enhanced unique host name referenced above, DNS may track the number of requests for a resource, and hence can track popularity.

Now, if a checksum were used, it could also be used to verify that the path was valid and/or that the hostname is correct for the resource. In some instances, a system may have problems when someone uses the hostname from one URL on a second unrelated URL—form of a "link hijacking." To validate a hostname relative to the path, if the hostname were or included a checksum, the receiving CDN node could immediately reject the request if it didn't align with the /path/resource being requested of it by a client. This check could be partial or complete; that is, the checksum may be over some portion of the /path/resource or it could be of the entire /path/resource. Using a part of /path/resource would mean that the popularity is being tracked for a set of resources rather than per resource, but with the benefit of somewhat reducing the number of names needing to be tracked. This may be of benefit when dealing with groups of closely related objects (e.g., individual chunks of a streaming video asset).

Figure 3:
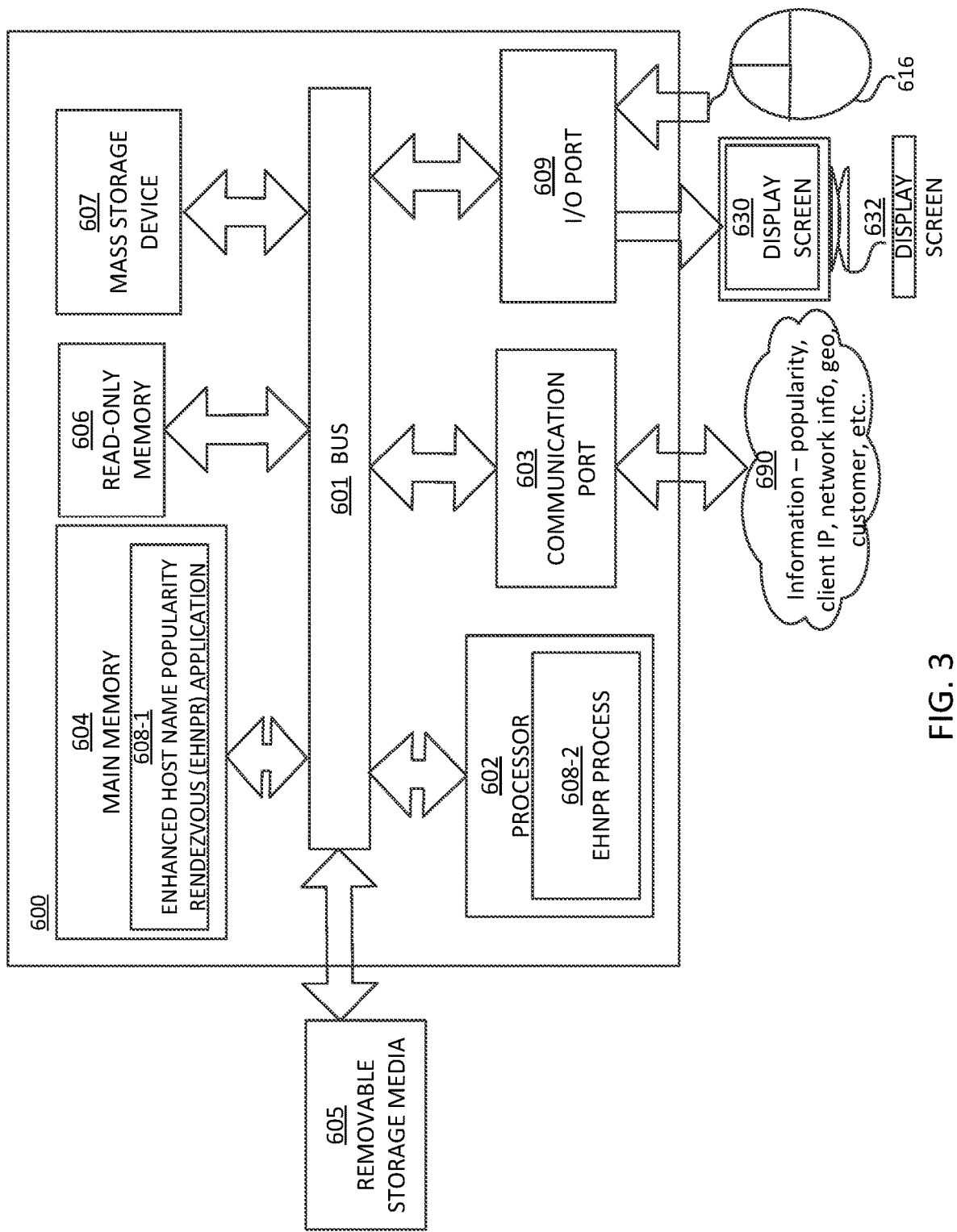
FIG. 3 is an example of a computing system that may implement various systems and methods discussed herein.

FIG. 3 is an example schematic diagram of a computing system 600 that may implement various methodologies discussed herein. The computing system for the application 608 includes a bus 601 (i.e., interconnect), at least one processor 602 or other compute element, at least one communication port 603, a main memory 604, a removable storage media 605, a read-only memory 606, and a mass storage device 607. Processor(s) 602 can be any known processor, such as, but not limited to, an Intel® Itanium® or Itanium 2® processor(s), AMD® Opteron® or Athlon MP® processor(s), or Motorola® lines of processors. Communication port 603 can be any of an RS-232 port for use with a modem based dial-up connection, a 10/100 Ethernet port, a Gigabit port using copper or fiber, or a USB port. Communication port(s) 603 may be chosen depending on a network such as a Local Area Network (LAN), a Wide Area Network (WAN), or any network to which the computer system 600 connects. The rendezvous application may be in communication with peripheral devices (e.g., display screen 630, input device 616 via Input/Output (I/O) port 609.

Main memory 604 can be Random Access Memory (RAM) or any other dynamic storage device(s) commonly known in the art. Read-only memory 606 can be any static storage device(s) such as Programmable Read-Only Memory (PROM) chips for storing static information such as instructions for processor 602. Mass storage device 607 can be used to store information and instructions. For example, hard disks such as the Adaptec® family of Small Computer Serial Interface (SCSI) drives, an optical disc, an array of disks such as Redundant Array of Independent Disks (RAID), such as the Adaptec® family of RAID drives, or any other mass storage devices, may be used.

Bus 601 communicatively couples processor(s) 602 with the other memory, storage and communications blocks. Bus 601 can be a PCI/PCI-X, SCSI, or Universal Serial Bus (USB) based system bus (or other) depending on the storage devices used. Removable storage media 605 can be any kind of external hard drives, thumb drives, Compact Disc-Read Only Memory (CD-ROM), Compact Disc-Re-Writable (CD-RW), Digital Video Disk-Read Only Memory (DVD-ROM), etc.

Embodiments herein may be provided as a computer program product, which may include a machine-readable medium having stored thereon instructions which may be used to program a computer (or other electronic devices) to perform a process. The machine-readable medium may include, but is not limited to, optical discs, CD-ROMs, magneto-optical disks, ROMs, RAMs, erasable programmable read-only memories (EPROMs), electrically erasable programmable read-only memories (EEPROMs), magnetic or optical cards, flash memory, or other type of media/machine-readable medium suitable for storing electronic instructions.

As shown, main memory 604 is encoded with an enhanced host name popularity rendezvous engine application 608-1 that supports functionality as discussed above and as discussed further below. For example, in one embodiment, the application 608-1 may include or otherwise implement the various processes and/or instructions described herein. The application 608-1 (and/or other resources as described herein) can be embodied as software code such as data and/or logic instructions (e.g., code stored in the memory or on another computer readable medium such as a disk) that supports processing functionality according to different embodiments described herein. During operation of one embodiment, processor(s) 602 accesses main memory 604 via the use of bus 601 in order to launch, run, execute, interpret or otherwise perform an EHNPR process 608-2, such as through logic instructions, executing on the processor 602 and based on the application 608-1 stored in main memory or otherwise tangibly stored.

The description above includes example systems, methods, techniques, instruction sequences, and/or computer program products that embody techniques of the present disclosure. However, it is understood that the described disclosure may be practiced without these specific details. In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium, optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic instructions.

It is believed that the present disclosure and many of its attendant advantages should be understood by the foregoing description, and it should be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it should be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A content delivery method comprising:
   receiving a uniform resource locator resolution request at a name server for a domain, the uniform resource locator resolution request received based, at least in part, on a host name of the uniform resource locator resolution request, the host name related to a resource associated with the uniform resource resolution request;
   tracking, at the name server, a popularity of the resource by determining a number of times the host name related to the resource is requested, wherein the host name includes an index uniquely related to the resource; and
   providing a node within a network capable of delivering the resource, the provided node based on the popularity of the resource.

2. The content delivery method of claim 1, wherein the node is an edge server within a content delivery network.

3. The content delivery method of claim 1 further comprising:
   validating that the host name matches the path and resource based on the checksum.

4. The content delivery method of claim 1, wherein the host name is unique to at least part of the path and the resource.

5. An apparatus comprising:
   at least one processing device in communication with a non-transitory computer readable media including computer executable instructions for:
   receiving a uniform resource locator resolution request at a name server for a domain, the uniform resource locator resolution request received based, at least in part, on a host name of the uniform resource locator resolution request, the host name related to a resource associated with the uniform resource resolution request;
   tracking, at the name server, a popularity of the resource by determining a number of times the host name related to the resource is requested, wherein the host name includes an index uniquely related to the resource; and
   providing a node within a network capable of delivering the resource, the provided node based on the popularity of the resource.

6. The apparatus of claim 5, wherein the node is an edge server within a content delivery network.

7. The apparatus of claim 5, the computer executable instructions further for validating that the host name matches the path and resource based on the checksum.

8. The apparatus of claim 5, wherein the host name is unique to at least part of the path and the resource.

9. At least one non-transitory computer-readable medium storing instructions that, when executed by at least one processor, cause the at least one processor to perform a method, the method comprising:
   receiving a uniform resource locator resolution request at a name server for a domain, the uniform resource locator resolution request received based, at least in part, on a host name of the uniform resource locator resolution request, the host name related to a resource associated with the uniform resource resolution request;
   tracking, at the name server, a popularity of the resource by determining a number of times the host name related to the resource is requested, wherein the host name includes an index uniquely related to the resource; and
   providing a node within a network capable of delivering the resource, the provided node based on the popularity of the resource.

10. The at least one non-transitory computer-readable medium of claim 9, wherein the host name is unique to at least part of the path and the resource.

* * * * *